United States Patent [19]

Cantatore et al.

[11] Patent Number: 4,987,228

[45] Date of Patent: Jan. 22, 1991

[54] POLYTRIAZINE COMPOUNDS CONTAINING RECURRING PIPERIDYLAMIDINOTRIAZINE STRUCTURAL UNITS AND THEIR USE AS STABILIZERS FOR ORGANIC MATERIALS

[75] Inventors: Giuseppe Cantatore, Bitonto; Valerio Borzatta, Bologna, both of Italy

[73] Assignee: Ciba-Geigy Corporation, Ardsley, N.Y.

[21] Appl. No.: 79,978

[22] Filed: Jul. 31, 1989

[30] Foreign Application Priority Data

Aug. 7, 1986 [IT] Italy ................. 21434 A/86

[51] Int. Cl.$^5$ .......................................... C07D 401/14
[52] U.S. Cl. ................................ 544/198; 544/212; 540/575; 540/598; 524/100; 528/423
[58] Field of Search ................ 524/100; 540/575, 598; 544/198, 212; 528/423

[56] References Cited

U.S. PATENT DOCUMENTS

| | | |
|---|---|---|
| 4,086,204 | 4/1978 | Cassandrini et al. ........ 260/45.8 NT |
| 4,108,829 | 8/1978 | Cassandrini et al. ........ 260/45.8 NT |
| 4,695,600 | 9/1987 | Avar .............................. 524/103 |

FOREIGN PATENT DOCUMENTS

| | | |
|---|---|---|
| 0042554 | 12/1981 | European Pat. Off. |
| 0045721 | 2/1982 | European Pat. Off. |
| 0109932 | 5/1984 | European Pat. Off. |
| 0117229 | 8/1984 | European Pat. Off. |
| 0148962 | 7/1985 | European Pat. Off. |
| 2106510A | 4/1983 | United Kingdom |
| 2143538 | 2/1985 | United Kingdom |
| 2176482 | 12/1986 | United Kingdom |

Primary Examiner—Kriellion Morgan
Attorney, Agent, or Firm—Stephen V. O'Brien

[57] ABSTRACT

Polytriazine compounds having a number average molecular weight from 1000 to 20,000 and containing recurring piperidylamidinotriazine structural units of the formula (IA)

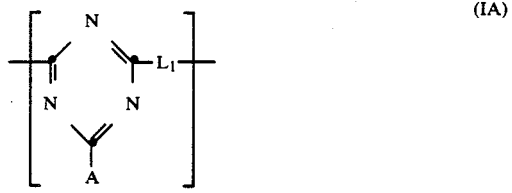

or a combination of said structural units of the formula (IA) with recurring structural units of the formula (IB)

[L$_2$—L$_3$]  (IB)

with molar proportions of (IA) and (IB) from 30% to 100% for (IA) and 0 to 70% for (IB), wherein A is a group of the formula (II)

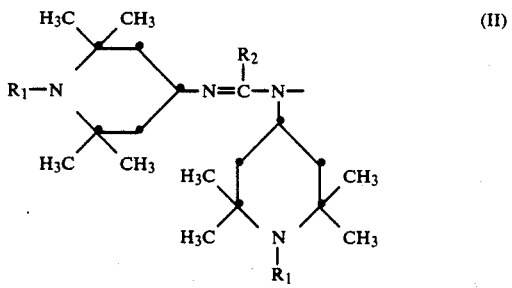

and L$_1$, L$_2$, L$_3$, R$_1$ and R$_2$ are as defined in claim 1, can be used as light stabilizers, heat stabilizers and oxidation stabilizers for organic materials, in particular synthetic polymers.

10 Claims, No Drawings

POLYTRIAZINE COMPOUNDS CONTAINING RECURRING PIPERIDYLAMIDINOTRIAZINE STRUCTURAL UNITS AND THEIR USE AS STABILIZERS FOR ORGANIC MATERIALS

The present invention relates to novel polytriazine compounds which contain piperidylamidinotriazine structural units and which can be used as light stabilizers, heat stabilizers and oxidation stabilizers for organic materials, especially synthetic polymers.

It is known that synthetic polymers undergo progressive changes in their physical properties, such as loss of mechanical strength and colour changes, when they are exposed to sunlight or other sources of ultraviolet light.

To retard the deleterious effect of ultraviolet radiation on synthetic polymers, it has been proposed to use various additives having light-stabilizing properties, such as certain benzophenone and benzotriazole derivatives, nickel complexes, alkylidenemalonates, cyanoacrylates and sterically hindered amines.

Certain derivatives of 2,2,6,6-tetramethylpiperidine of low molecular weight have shown remarkable effectiveness, but they have neither solved the problem of stabilizing articles of large surface area, such as polypropylene fibres, because of their remarkable tendency to volatilization and extraction, nor the problem of stabilizing low-density polyethylene film because of poor compatibility with this polymer.

For these applications, certain derivatives of 2,2,6,6-tetramethylpiperidine of relatively high molecular weight have been proposed, which show an effectiveness as light stabilizers, resistance to volatilization and extraction, and compatibility with polymers. In particular, some polytriazine compounds are disclosed in U.S. Pat. Nos. 4,086,204 and 4,108,829.

GB Patent No. 2,176,482 discloses piperidyl formamidine derivatives and their use as light stabilizers.

GB Patent No. 2,106,510 discloses polymeric malonic acid derivatives containing polyalkylpiperidinyl radicals.

EP Patent No. 148,962 describes bis(2,2,6,6-tetramethylpiperidyl-1,3,5-triazinyl)-spirodiamines and spiroglycol ethers and synthetic resin compositions containing the same.

EP Patent No. 109,932 claims a process for the preparation of oligomeric polyesteramides containing polyalkylpiperidinyl radicals.

The present invention relates to novel polytriazine compounds having a number average molecular weight from 1000 to 20 000 and containing recurring piperidylamidinotriazine structural units of the formula (IA)

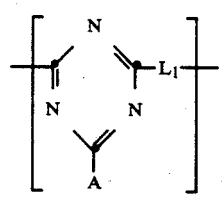
(IA)

or a combination of said structural units of the formula (IA) with recurring structural units of the formula (IB)

$$-[-L_2-L_3-]-\qquad \text{(IB)}$$

with molar proportions of (IA) and (IB) from 30% to 100% for (IA) and 0 to 70% for (IB), A is a group of the formula (II)

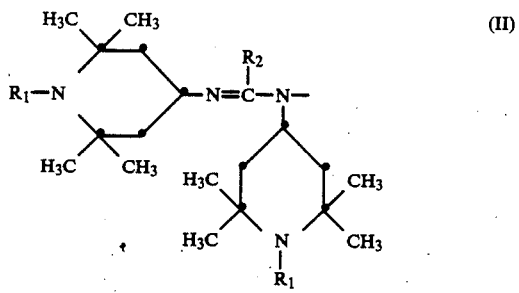

where $R_1$ is hydrogen, O, CN, NO, cyanomethyl, $C_1-C_{12}$-alkyl, $C_3-C_{12}$-alkyl or $C_3-C_{12}$-alkenyl with the proviso that the carbon atom attached to the nitrogen atom is a primary carbon atom, $C_7-C_{12}$-aralkyl, $C_1-C_{12}$-acyl, 2,3-epoxypropyl, 2,3-dihydroxypropyl or OH-monosubstituted $C_2-C_6$-alkyl and $R_2$ is hydrogen, $C_1-C_{18}$-alkyl, $C_5-C_{18}$-cycloalkyl, $C_6-C_{18}$-aryl or $C_7-C_{18}$-aralkyl, $L_1$ and $L_3$ which are identical or different are groups of the formula (III)

in which $R_3$ and $R_5$ which are identical or different are hydrogen, $C_1-C_{12}$-alkyl, $C_5-C_{12}$-cycloalkyl or a group of the formula (IV)

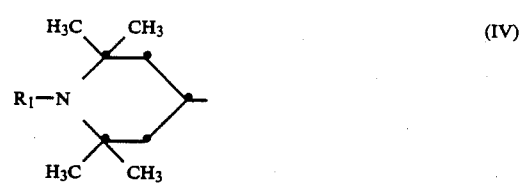

with $R_1$ being as defined above, and $R_4$ is $C_2-C_{12}$-alkylene, $C_6-C_{15}$-cycloalkylene, $C_6-C_{12}$-arylene, $C_7-C_{12}$-aralkylene or $C_4-C_{12}$-alkylene which is interrupted in the chain by one or two oxygen atoms or by one or two groups

$R_6$ being as defined for $R_3$ and $R_5$, or $L_1$ and/or $L_3$ are heterocyclic groups of the formula (V), (Va) or (Vb)

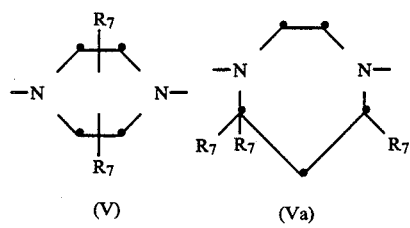

(V)  (Va)

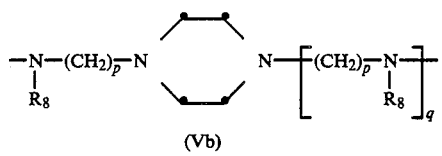

(Vb)

in which $R_7$ is hydrogen or methyl, $R_8$ is as defined for $R_3$ and $R_5$, p is an integer from 2 to 6 and q is 0 or 1, and, if the polytriazine compound essentially consists of recurring structural units of the formula (IA), $L_1$ is additionally a group of the formula (VI)

$$-O-R_9-O- \qquad (VI)$$

in which $R_9$ is $C_2$-$C_{12}$-alkylene, $C_4$-$C_{12}$-alkylene which is interrupted in the chain by one or two oxygen atoms, $C_6$-$C_{15}$-cycloalkylene, $C_6$-$C_{12}$-arylene, $C_7$-$C_{12}$-aralkylene or a group of the formula (VII)

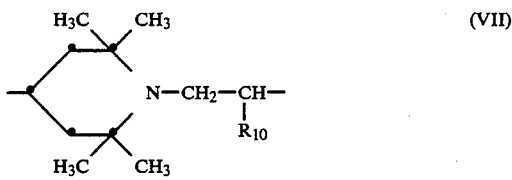

(VII)

with $R_{10}$ being hydrogen, $C_1$-$C_4$-alkyl or phenyl, $L_2$ is $C_2$-$C_{12}$-alkylene which is interrupted in the chain by one or two oxygen atoms, $C_3$-$C_6$-hydroxyalkylene, $C_7$-$C_{12}$-aralkylene, $C_2$-$C_{18}$-diacyl, $C_4$-$C_{18}$-dicarbamoyl, $C_1$-$C_{10}$-alkylene-CO-or a group of the formula (VIII) or (IX)

$$-COO-R_{11}-OOC- \qquad (VIII)$$

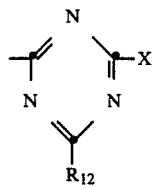

(IX)

in which $R_{11}$ is as defined for $R_9$ and $R_{12}$ is morpholino, pyrrolidino, piperidino, 1-hexahydroazepinyl or a group $R_{13}Z-$ where $R_{13}$ is hydrogen, $C_1$-$C_{12}$-alkyl, $C_3$-$C_{12}$-cycloalkyl, $C_5$-$C_{12}$-alkenyl or a group of the formula (IV) and $-Z-$ is $-O-$, $-S-$ or a group

where $R_{14}$ is as defined for $R_{13}$, with the proviso that, if the polytriazine compound contains a combination of structural units of the formula (IA) with those structural units of the formula (IB), at least one group of the formula (IV) is present in $L_1$ or $L_2$ or $L_3$.

In the individual recurring structural units of the formulae (IA) and (IB), the A, $L_1$, $L_2$ and $L_3$ can have the same or different meanings. The polytriazine compounds of the instant invention can thus be homopolymers or copolymers with random distribution of the individual structural units. They can also be copolymers which have at least in part a block-like arrangement of identical structural units and further structural units with different meanings of A, $L_1$, $L_2$ and $L_3$.

Depending on the type and molar amounts of the starting materials (monomers) used, the polytriazine compounds can have different terminal groups.

The terminal group attached to the triazine residue is for example halogen, preferably Cl, or is OH, ONa, OK, $C_1$-$C_4$-alkoxy, a group of the formula (II) or a group $-L_1H$ or $-L_3H$; the terminal group attached to $L_2$ is e.g. $-L_1H$ or $-L_3H$ and if $L_2$ is $C_2$-$C_{12}$-alkylene, $C_4$-$C_{12}$-alkylene which is interrupted in the chain by one or two oxygen atoms or is $C_7$-$C_{12}$-aralkylene, the terminal group can additionally be e.g. halogen, preferably Cl, or OH, if $L_2$ is $C_2$-$C_{18}$-diacyl or $C_1$-$C_{10}$-alkylene-CO, the terminal group can additionally be OH, ONa, OK or $C_1$-$C_4$-alkoxy, if $L_2$ is $C_3$-$C_6$-hydroxyalkylene, the terminal group can additionally be e.g. hydrogen or OH, if $L_2$ is $C_4$-$C_{18}$-dicarbamoyl, the terminal group can additionally be e.g. The group $-N=C=O$ itself, if $L_2$ is a group of the formula (VIII), the terminal group can additionally be e.g. OH and if $L_2$ is a group of the formula (IX), the terminal group can additionally be e.g. halogen, in particular Cl, or OH, ONa, OK, $C_1$-$C_4$-alkoxy or a group of the formula (II); and the terminal group attached to the radical $L_1$ or $L_3$ is e.g. hydrogen, a group

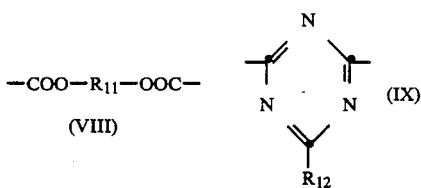

or a group $-L_2OH$, $L_1$, $L_2$, $L_3$, $R_{12}$ being as defined above and X being e.g. halogen, preferably Cl, or OH, ONa, OK, $C_1$-$C_4$-alkoxy, a group of the formula (II) or a group $-L_1H$ or $L_3H$.

$R_1$, $R_3$, $R_5$, $R_6$, $R_8$, $R_{13}$ and $R_{14}$ as $C_1$-$C_{12}$-alkyl are for example methyl, ethyl, propyl, isopropyl, butyl, 2-butyl, isobutyl, t-butyl, pentyl, isopentyl, hexyl, heptyl, octyl, t-octyl, 2-ethylhexyl, nonyl, decyl, undecyl or dodecyl. $C_1$-$C_4$-alkyl which may be straight chain or branched is preferred. $R_1$ as methyl is especially preferred.

$R_1$, $R_{13}$ and $R_{14}$ as $C_3$-$C_{12}$-alkenyl are for example allyl, 2-methallyl, 2-butenyl, 2-hexenyl or 10-undecenyl. Allyl is especially preferred.

$R_1$ as $C_3$-$C_{12}$-alkynyl may be preferably propargyl.

$R_1$ as $C_7$–$C_{12}$-aralkyl is for example benzyl, methylbenzyl or t-butylbenzyl. $C_7$–$C_{10}$-phenylalkyl unsubstituted or substituted at the phenyl ring by alkyl is preferred. Benzyl and benzyl substituted by $C_1$–$C_4$-alkyl are especially preferred.

$R_1$ as $C_1$–$C_{12}$-acyl may be an aliphatic or aromatic acyl group. $C_1$–$C_{12}$-alkanoyl, $C_3$–$C_{12}$-alkenoyl, $C_3$–$C_{12}$-alkynoyl, benzoyl and benzoyl substituted by $C_1$–$C_4$-alkyl and/or by OH are preferred. Examples are formyl, acetyl, propionyl, butyryl, caproyl, capryloyl, caprinoyl, lauroyl, benzoyl, acryloyl, methacryloyl and crotonyl.

$R_1$ as OH— monosubstituted $C_2$–$C_6$-alkyl is for example 2-hydroxyethyl, 2-hydroxypropyl or 3-hydroxypropyl.

$R_2$ as $C_1$–$C_{18}$-alkyl is for example methyl, ethyl, propyl, isopropyl, butyl, isobutyl, 2-butyl, t-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl or octadecyl. $R_2$ is preferably $C_1$–$C_4$-alkyl, in particular methyl.

$R_2$ as $C_5$–$C_{18}$-cycloalkyl is preferably a cycloalkyl group of the formula

with a being an integer from 4 to 11. Said cyclalkyl group may optionally be substituted by $C_1$–$C_4$-alkyl. Examples are cyclopentyl, cyclohexyl, methylcyclohexyl, dimethylcyclohexyl, trimethylcyclohexyl, t-butylcyclohexyl, cyclooctyl and cyclododecyl. Cyclopentyl and Cyclohexyl, each unsubstituted or substituted by $C_1$–$C_4$-alkyl are especially preferred.

$R_2$ as $C_6$–$C_{18}$-aryl is preferably phenyl unsubstituted or substituted by $C_1$–$C_4$-alkyl, $C_1$–$C_4$-alkoxy and/or OH. Preferred examples of $R_2$ are phenyl, methylphenyl, dimethylphenyl, trimethylphenyl, ethylphenyl, t-butylphenyl, methoxyphenyl, ethoxyphenyl, hydroxyphenyl and 3,5-di-t-butyl-4-hydroxyphenyl with phenyl being especially preferred.

$R_2$ as $C_7$–$C_{18}$-aralkyl may be $C_7$–$C_{12}$-phenylalkyl unsubstituted or substituted at the phenyl ring by $C_1$–$C_4$-alkyl and/or OH. Examples are benzyl, methylbenzyl, hydroxybenzyl, 3,5-di-t-butyl-4-hydroxybenzyl and 2-(3,5-di-t-butyl-4-hydroxyphenyl)ethyl. Benzyl unsubstituted or substituted is preferred.

$R_3$, $R_5$, $R_6$, $R_8$, $R_{13}$ and $R_{14}$ as $C_5$–$C_{12}$-cycloalkyl are preferably a cycloalkyl group of the formula

with a being an integer from 4 to 7. Said cycloalkyl group may optionally be substituted by $C_1$–$C_4$-alkyl. Examples are cyclopentyl, cyclohexyl, methylcyclohexyl, trimethylcyclohexyl, t-butylcyclohexyl, cyclooctyl and cyclododecyl. Cyclopentyl and cyclohexyl, each unsubstituted or substituted by $C_1$–$C_4$-alkyl are especially preferred.

$R_3$, $R_5$, $R_6$ and $R_8$ are preferably 2,2,6,6-tetramethyl-4-piperidyl or 1,2,2,6,6-pentamethyl-4-piperidyl.

$R_4$, $R_9$, $R_{11}$ and $L_2$ as $C_2$–$C_{12}$-alkylene are for example ethylene, propylene, trimethylene, tetramethylene, pentamethylene, 2,2-dimethyltrimethylene, hexamethylene, heptamethylene, octamethylene, trimethylhexamethylene, decamethylene or dodecamethylene. $C_2$–$C_6$-alkylene is preferred. Hexamethylene is especially preferred.

$R_4$, $R_9$ and $R_{11}$ as $C_6$–$C_{15}$-cycloalkylene may be a saturated hydrocarbon group with two free valencies and at least one cyclic unit.

In particular, $R_4$, $R_9$ and $R_{11}$ may be cyclohexylene, alkylene-cyclo-hexylene-alkylene with 8 to 15 carbon atoms, cyclohexylene-alkylene-cyclohexylene with 13 to 15 carbon atoms or alkylidenedicyclohexylene with 14 to 15 carbon atoms. Preferred examples are cyclohexylene, cyclohexylenedimethylene, methylenedicyclohexylene and isopropylidenedicyclohexylene.

$R_4$, $R_9$ and $R_{11}$ as $C_6$–$C_{12}$-arylene may be phenylene unsubstituted or substituted by $C_1$–$C_6$-alkyl or may be biphenylene. Preferred examples are 1,2-phenylene, 1,3-phenylene and 1,4-phenylene.

$R_4$, $R_9$, $R_{11}$ and $L_2$ as $C_7$–$C_{12}$-aralkylene are for example alkylenephenylene with 7 to 12 carbon atoms or alkylene-phenylene-alkylene with 8 to 12 carbon atoms, preferably dimethylenephenylene (xylylene).

$R_4$, $R_9$, $R_{11}$ and $L_2$ as $C_4$–$C_{12}$-alkylene which is interrupted in the chain by one or two oxygen atoms are preferably 3-oxapentane-1,5-diyl, 4-oxaheptane-1,7-diyl, 3,6-dioxaoctane-1,8-diyl, 4,7-dioxadecane-1,10-diyl or 4,9-dioxadodecane-1,12-diyl.

Representative examples of $L_1$ and $L_3$ as a divalent heterocyclic group are

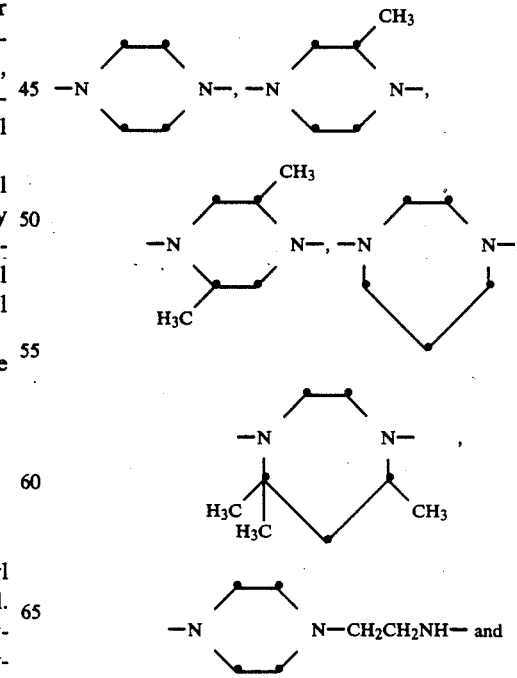

-continued

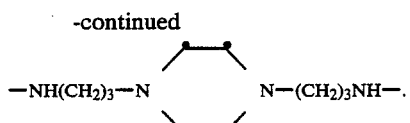

$R_{10}$ as $C_1$–$C_4$-alkyl is for example methyl, ethyl, propyl, isopropyl or butyl.

$L_2$ as $C_3$–$C_6$-hydroxyalkylene is preferably 2-hydroxypropane-1,3-diyl.

$L_2$ as $C_2$–$C_{18}$-diacyl may be an aliphatic or aromatic diacyl group. $C_2$–$C_{18}$-alkanedioyl and phenylenedicarbonyl are preferred. Examples are oxalyl, malonyl, ethylmalonyl, succinyl, glutaryl, adipoyl, sebacoyl, phthaloyl, isophthaloyl and terephthaloyl.

$L_2$ as $C_4$–$C_{18}$-dicarbamoyl may be an aliphatic or aromatic dicarbamoyl group. $C_4$–$C_{18}$-alkylenedicarbamoyl, alkylene-bis(phenylcarbamoyl) with 15 to 18 carbon atoms, phenylenedicarbamoyl unsubstituted or substituted by $C_1$–$C_4$-alkyl are preferred. Examples are hexamethylenedicarbamoyl, trimethylhexamethylenedicarbamoyl, tolylenedicarbamoyl and methylene-bis(phenylcarbamoyl).

$L_2$ as $C_1$–$C_{10}$-alkylene-CO— is preferably a group —$(CH_2)_{1-10}$—CO—.

$R_{13}$ is preferably 2,2,6,6-tetramethyl-4-piperidyl or 1,2,2,6,6-pentamethyl-4-piperidyl.

Those polytriazine compounds containing structural units of the formula (IA) or a combination of structural units of formulae (IA) and (IB) are of interest, wherein R: is hydrogen, methyl, allyl, benzyl or acetyl and $R_2$ is hydrogen, $C_1$–$C_{18}$-alkyl, cyclopentyl, cyclohexyl unsubstituted or substituted by $C_1$–$C_4$-alkyl, phenyl unsubstituted or substituted by $C_1$–$C_4$-alkyl, by $C_1$–$C_4$-alkoxy and/or by OH, or is $C_7$–$C_{12}$-phenylalkyl unsubstituted or substituted at the phenyl ring by $C_1$–$C_4$-alkyl and/or by OH, $L_1$ and $L_3$ which are identical or different are groups of the formula (III)

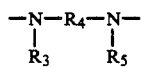   (III)

in which $R_3$ and $R_5$ which are identical or different are hydrogen, $C_1$–$C_{12}$-alkyl, cyclopentyl, cyclohexyl unsubstituted or substituted $C_1$–$C_4$-alkyl or are a group of the formula (IV)

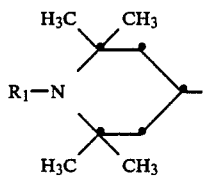   (IV)

with $R_1$ being as defined above, and $R_4$ is $C_2$–$C_{12}$-alkylene, cyclohexylene, alkylene-cyclohexylene-alkylene with 8 to 15 carbon atoms, cyclohexylene-alkylene-cyclohexylene with 13 to 15 carbon atoms or alkylidenedicyclohexylane with 14 to 15 carbon atoms, phenylene unsubstituted or substituted by $C_1$–$C_6$-alkyl, biphenylene, alkylenephenylene with 7 to 12 carbon atoms, alkylene-phenylene-alkylene with 8 to 12 carbon atoms or $C_4$–$C_{12}$-alkylene which is interrupted in the chain by one or two oxygen atoms or by one or two groups $$\diagdown \!\!\!\! \diagup \!\! NR_6,$$

$R_6$ being as defined for $R_3$ and $R_5$, or $L_1$ and/or $L_3$ are heterocyclic groups of the formula (V), (Va) or (Vb)

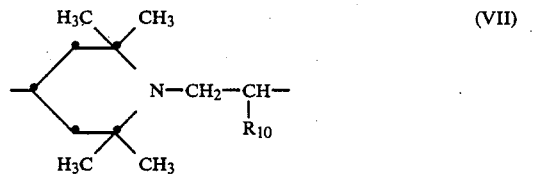

in which $R_7$ is hydrogen or methyl, $R_8$ is as defined for $R_3$ and $R_5$, p is an integer from 2 to 6 and q is 0 or 1, and, if the polytriazine compound essentially consists of recurring structural units of the formula (IA), $L_1$ is additionally a group of the formula (VI)

—O—$R_9$—O—   (VI)

in which $R_9$ is $C_2$–$C_{12}$-alkylene, $C_4$–$C_{12}$-alkylene which is interrupted in the chain by one or two oxygen atoms, cyclohexylene, alkylene-cyclohexylene-alkylene with 8 to 15 carbon atoms, cyclohexylene-alkylene-cyclohexylene with 13 to 15 carbon atoms or alkylidenedicyclohexylene with 14 to 15 carbon atoms, phenylene unsubstituted or substituted by $C_1$–$C_6$-alkyl, biphenylene, alkylene-phenylene with 7 to 12 carbon atoms, alkylene-phenylene-alkylene with 8 to 12 carbon atoms, or a group of the formula (VII)

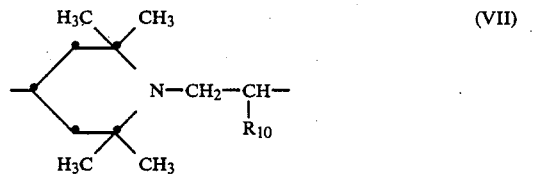   (VII)

with $R_{10}$ being hydrogen, $C_1$–$C_4$-alkyl or phenyl, $L_2$ is $C_2$–$C_{12}$-alkylene, $C_4$–$C_{12}$-alkylene which is interrupted in the chain by one or two oxygen atoms, $C_3$–$C_6$-hydroxyalkylene, alkylenephenylene with 7 to 12 carbon atoms, alkylene-phenylene-alkylene with 8 to 12 carbon atoms, $C_2$–$C_{18}$-alkanedioyl, phenylenedicarbonyl, $C_4$–$C_{18}$-alkylenedicarbamoyl, phenylenedicarbamoyl unsubstituted or substituted by $C_1$–$C_4$-alkyl, alkylene-bis(phenylcarbamoyl) with 15 to 18 carbon atoms, $C_1$–$C_{10}$-alkylene-CO— or a group of the formula (VIII) or (IX)

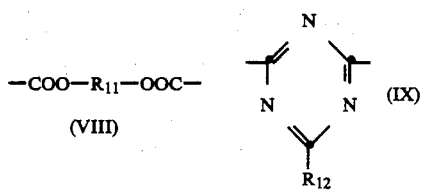

in which $R_{11}$ is as defined for $R_9$ and $R_{12}$ is morpholino, pyrrolidino, piperidino, 1-hexahydroazepinyl or a group $R_{13}Z$— where $R_{13}$ is hydrogen, $C_1$–$C_{12}$-alkyl, cyclopentyl, cyclohexyl unsubstituted or substituted by $C_1$–$C_4$-alkyl, $C_3$–$C_{12}$-alkenyl or a group of the formula (IV) and —Z— is —O—, —S— or a group

where $R_{14}$ is as defined for $R_{13}$,

Those polytriazine compounds containing structural units of the formula (IA) or a combination of structural units of formulae (IA) and (IB) are preferred, in which $R_1$ is hydrogen, methyl, allyl, benzyl or acetyl, $R_2$ is hydrogen, $C_1$–$C_{12}$-alkyl, $C_6$–$C_9$-cycloalkyl or $C_6$–$C_9$-aryl, $L_1$ and $L_3$ which are identical or different are groups of the formula (III) in which $R_3$ and $R_5$ which are identical or different are hydrogen, $C_1$–$C_8$-alkyl, $C_6$–$C_9$-cycloalkyl or a group of the formula (IV) with $R_1$ being as defined above and $R_4$ is $C_2$–$C_{12}$-alkylene, $C_4$–$C_{12}$-alkylene interrupted in the chain by one or two oxygen atoms or is $C_6$–$C_{15}$-cycloalkylene, or $L_1$ and/or $L_3$ are

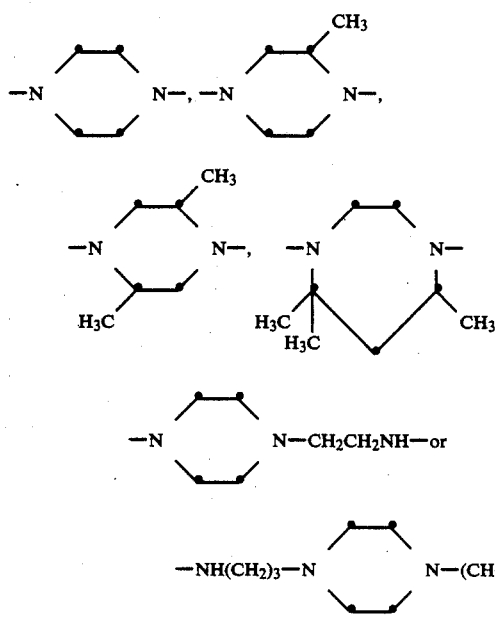

and, if the polytriazine compound essentially consists of recurring structural units of the formula (IA), $L_1$ is additionally a group of the formula (VI) in which $R_9$ is $C_2$–$C_{10}$-alkylene, $C_4$–$C_6$-alkylene interrupted in the chain by one or two oxygen atoms, $C_6$–$C_{15}$-cycloalkylene or a group of the formula (VII) with $R_{10}$ being hydrogen or methyl, $L_2$ is $C_2$–$C_{10}$-alkylene, 2-hydroxypropane-1,3-diyl, xylylene, $C_2$–$C_{12}$-diacyl, a group —(CH$_2$)$_s$—CO— where s is an integer from 2 to 5, a group of the formula (VIII) with $R_{11}$ being $C_4$–$C_{10}$-alkylene or $C_6$–$C_{15}$-cycloalkylene, or a group of the formula (IX) in which $R_{12}$ is morpholino, piperidino, 1-hexahydroazepinyl or a group $R_{13}Z$— where $R_{13}$ is hydrogen, $C_1$–$C_8$-alkyl, $C_6$–$C_9$-cycloalkyl, $C_3$–$C_6$-alkenyl or a group of the formula (IV) with $R_1$ being as defined above and Z is —O— or a group

where $R_{14}$ is as defined for $R_{13}$.

Those polytriazine compounds containing structural units of the formula (IA) or a combination of structural units of formulae (IA) and (IB) are particularly preferred, in which $R_1$ and $R_2$ independently of one another are hydrogen or methyl, $L_1$ and $L_3$ which are identical or different are groups of the formula (III) in which $R_3$ and $R_5$ which are identical or different are hydrogen, $C_1$–$C_4$-alkyl, cyclohexyl, 2,2,6,6-tetramethyl-4-piperidyl or 1,2,2,6,6-penta-methyl-4-piperidyl and $R_4$ is $C_2$–$C_6$-alkylene or $C_6$–$C_{10}$-alkylene interrupted in the chain by 2 oxygen atoms, or $L_1$ and/or $L_3$ are

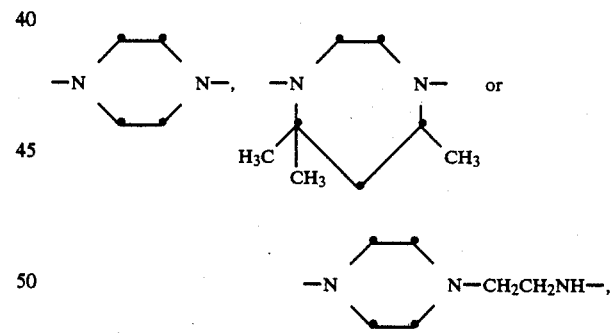

$L_2$ is $C_2$–$C_6$-alkylene, 1,3-diyl, xylylene, $C_2$–$C_6$-diacyl or —CH$_2$CO—.

Also preferred are polytriazine compounds containing recurring structural units of the formula (IA) wherein $R_1$ and $R_2$ are hydrogen and $L_1$ is a group

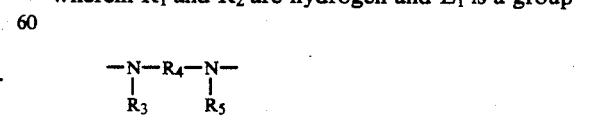

in which $R_3$ and $R_5$ are independently hydrogen or 2,2,6,6-tetramethyl-4-piperidyl and $R_4$ is —(CH$_2$)$_{2-6}$— or —(CH$_2$)$_3$O(CH$_2$)$_2$O(CH$_2$)$_3$—, or $L_1$ is

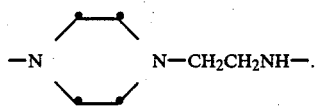

According to a further preferred embodiment $R_1$ and $R_2$ are hydrogen, and $L_1$ is a group

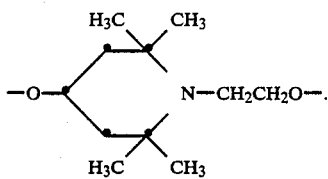

Those polytriazine compounds containing structural units of the formula (IA) or a combination of structural units of the formulae (IA) and (IB) are of interest, wherein $R_1$, and $R_2$ are hydrogen, $L_1$ and $L_3$ are independently

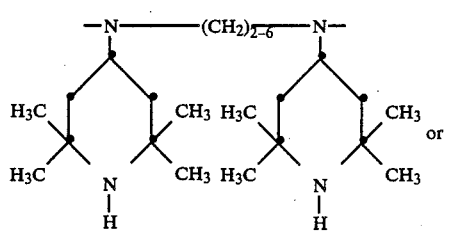

$-NH-(CH_2)_{\overline{2-6}}-NH-$ and $L_2$ is $-CH_2\underset{\underset{OH}{|}}{C}HCH_2-$.

Those polytriazine compounds containing structural units of the formula (IA) or a combination of structural units of the formulae (IA) and (IB) are particularly preferred, wherein $R_1$ and $R_2$ are independently hydrogen or methyl, $L_1$ and $L_3$ are independently groups of the formula (III) in which $R_3$ and $R_5$ are independently hydrogen, cyclohexyl or 2,2,6,6-tetramethyl-4-piperidyl and $R_4$ is $C_2$-$C_6$-alkylene or $C_4$-$C_{12}$-alkylene which is interrupted in the chain by one or two oxygen atoms, or are a group of the formula (Vb) with $q=0$, p being an integer from 2 to 6 and $R_8$ being hydrogen, and $L_2$ is 2-hydroxypropylene or $C_2$-$C_{18}$-alkanedioyl.

Polytriazine compounds containing recurring piperidylamidinotriazine structural units of the formula

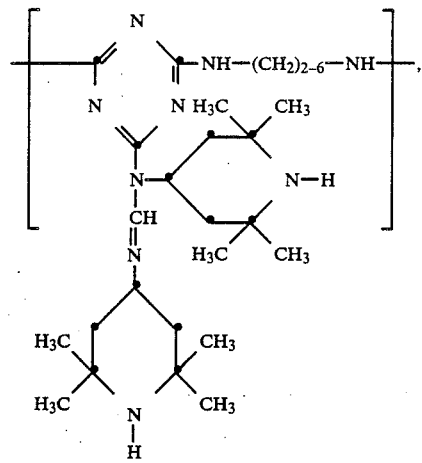

or

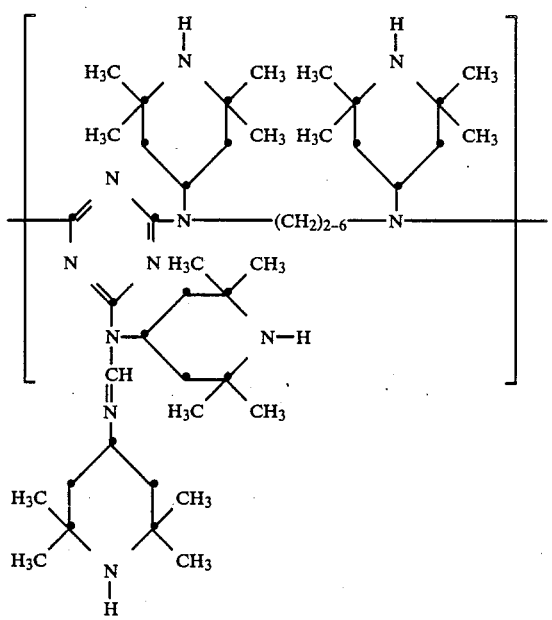

or containing a combination of recurring structural units of the formula

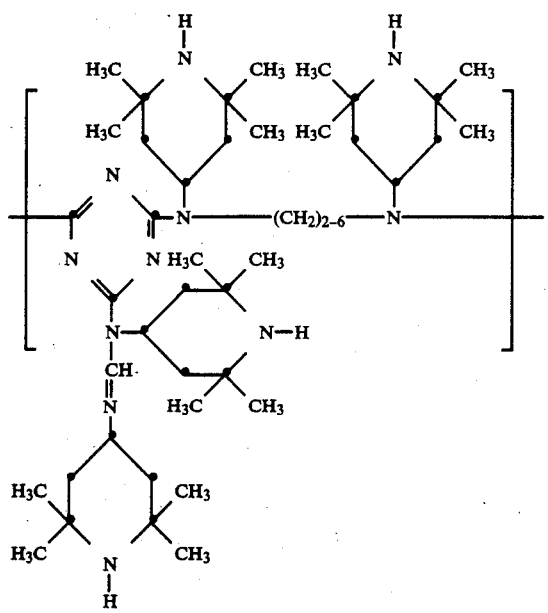

with recurring structural units of the formula

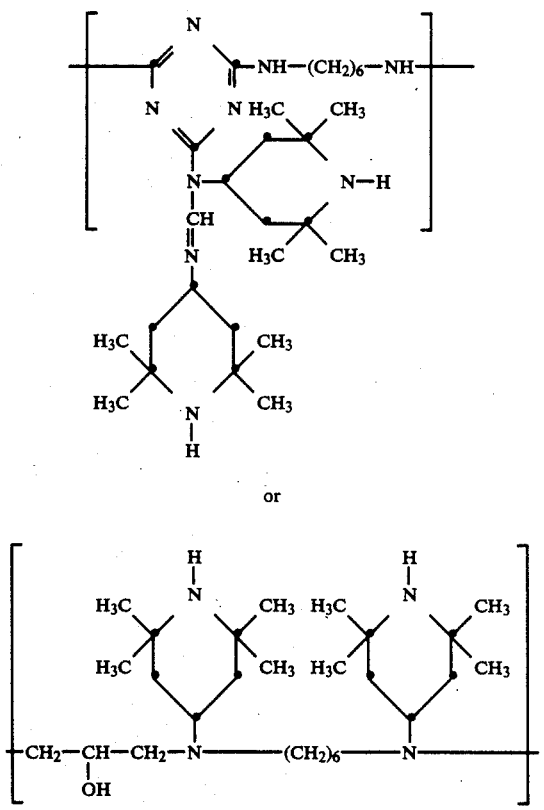

are of interest.

$R_1$ is preferably hydrogen, methyl, allyl, benzyl or acetyl, in particular hydrogen or methyl.

$R_2$ is preferably hydrogen or methyl.

The polytriazine compounds of the invention have preferably a number average molecular weight from 1500 to 10 000, in particular 2000 to 5000.

The molar proportions of (IA) and (IB) are preferably 50 % to 100 % for (IA) and 0 to 50 % for (IB).

The polytriazines of the invention can be prepared by various methods known per se, depending on the meanings of Lhd 1, $L_2$ and $L_3$. Homopolymers and copolymers having structural units of the formula (IA) can be obtained by reacting cyanuric chloride in either sequence (schemes 1 and 2) with one or more amidines AH and one or more compounds of the formula H—L$_1$—H, according to the following reaction schemes:

Scheme 1:

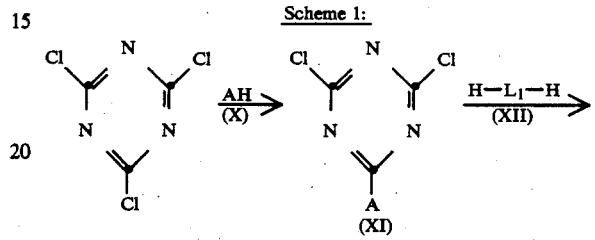

A polytriazine compound containing recurring structural units of the formula (IA).

Scheme 2:

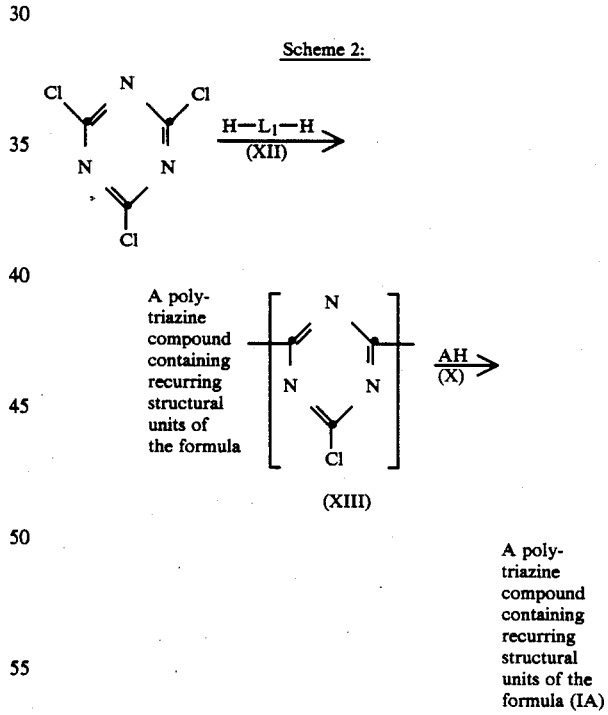

A polytriazine compound containing recurring structural units of the formula (IA)

If different compounds of the formula AH (X) and/or different diamines or diols of the formula H—L$_1$—H (XII) are used, the resultant polytriazine is a copolymer.

For preparing copolymers, the above reactions can also be carried out stepwise either by first reacting two moles of a dichlorotriazine of the formula (XI) or two moles of cyanuric chloride with one mole of a first compound of the formula (XII) to give a compound of the formula (XIV) or (XV)

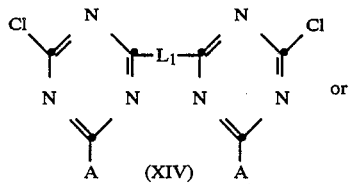

(XIV)

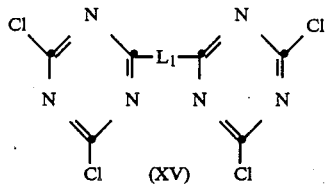

(XV)

Bis(dichlorotriazines) of the formula (XV) are then first reacted with 2 moles of a compound AH to give a bis[dichlorotriazine]compound of the formula (XIV) which is then reacted with a different diamine or diol of the formula (XII).

Polytriazines essentially consisting of structural units of the formula (IA) wherein $L_1$ is a group of the formula (VI) (residue of a diol) can also be prepared by reacting a dichlorotriazine of the formula (XI) or a compound of the formula (XVI)

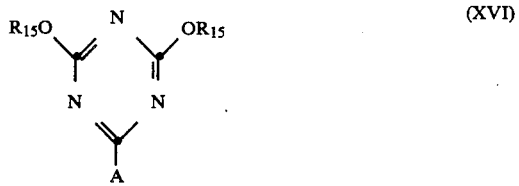

(XVI)

wherein $R_{15}$ is $C_1$-$C_4$-alkyl, with one or more diols of the formula HO—$R_9$—OH (XVII), $R_9$ having the meaning given above.

In the case where the starting compound is the dichlorotriazine (XI) the reaction can be carried out in an inert organic solvent and in the presence of an organic or inorganic base, for example pyridine, triethylamine, tripropylamine, tributylamine or sodium or potassium hydroxide or carbonate, at temperatures from 40° to 200° C., preferably 50° to 180° C.

Starting from the dialkoxytriazine (XVI), the reaction can be carried out with or without a solvent in the presence of a transesterification catalyst, such as alkali metals or alkali metal alcoholates, hydrides or amides, at a temperature from 80° to 250° C., preferably 100° to 200° C.

Polytriazines containing a combination of structural units of the formulae (IA) and (IB) can be prepared by reacting a dichlorotriazine of the formula (XI) with compounds of the formulae (XII), (XVIII) and (XIX).

W—$L_2$—W     (XVIII)

H—$L_3$—H     (XIX)

W is preferably chlorine or bromine or when $L_2$ is $C_2$-$C_{18}$-diacyl, W can be $C_1$-$C_4$-alkoxy or W—$L_2$—W is epichlorohydrin or a $C_4$-$C_{18}$-diisocyanate, in particular hexamethylenediisocyanate, 2,4-toluenediisocyanate or

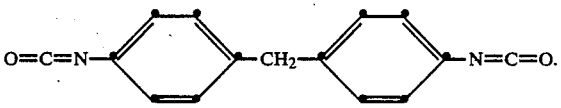

In the above reaction, the dichlorotriazine (XI) and the reagent (XVIII) can be reacted simultaneously or separately with the compounds (XII) and (XIX) respectively; if the compound (XVIII) is a diacyl halide, a diisocyanate or a bis-chloroformate, it is preferred first to react the compound (XI) and then the compound (XVIII).

All the reactions shown above are preferably carried out in an inert solvent in the presence of a base at temperatures from −30° to 200° C.

The reaction medium used can be solvents, for example benzene, toluene, xylene, trimethylbenzene, ethylbenzene, chlorobenzene, decalin, octane, decane, dioxane, dibutyl ether, 1,2-dimethoxyethane, 1,2-diethoxyethane, diethylene glycol dimethyl ether, diethylene glycol diethyl ether, dimethylformamide, dimethylacetamide, N-methylpyrrolidone or dimethl sulfoxide. To fix the hydrohalic acid released during the reaction, an organic or inorganic base can be used, for example pyridine, triethylamine, tripropylamine, tributylamine or sodium or potassium hydroxide or carbonate, in a quantity at least equivalent to the hydrohalic acid released. The substitution of the first chlorine atom of cyanuric chloride is preferably carried out at temperatures from −30° to 40° C., in particular from −20° to 20° C., the substitution of the second chlorine atom is preferably carried out at 40° to 100° C., in particular 50° to 90° C., and the substitution of the third chlorine atom is preferably carried out at 100° to 200° C., in particular 120° to 180° C.

In all the cases envisaged, the ratio between the reagents can be the theoretical, or an excess of any one of the reagents can be employed for improving control of the molecular weight of the compounds according to the present invention.

The chlorotriazines (XI), (XIV) and (XV) can be employed directly without isolation from the reaction mixtures, or after having been isolated.

The amidines (X) can be prepared by various methods known per se, for example by reacting 2 moles of a piperidylamine (XX) with 1 mol of the ortho-ester (XXI), in which $R_{16}$ is preferably $C_1$-$C_{14}$-alkyl, with elimination of the alcohol $R_{16}OH$.

Scheme 3:

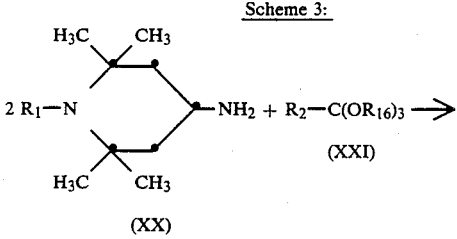

-continued
Scheme 3:

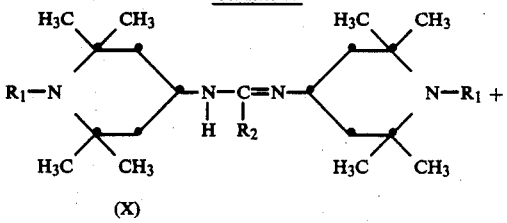

(X)

3 R$_{16}$OH

This reaction can be carried out with or without an inert solvent at a temperature from 80° to 250° C.

The starting materials needed for the preparations described above are items of commerce or can be prepared by known methods.

As mentioned at the outset, the compounds of the invention are very effective in improving the light stability, heat stability and oxidation stability of organic materials, in particular synthetic polymers, especially polyethylene and polypropylene.

In general polymers which can be stabilized include:

1. Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefines and diolefines with each other or with other vinyl monomers, such as, for example, ethylene/propylene, linear low density polyethylene (LLDPE) and its mixtures with low density polyethylene (LDPE), propylene/butene-1, ethylene/hexene, ethylene/ethylpentene, ethylene/heptene, ethylene/octene, propylene/isobutylene, ethylene/butene-1, propylene/butadiene, isobutylene/isoprene, ethylene/alkyl acrylates, ethylene/alkyl methacrylates, ethylene/vinyl acetate or ethylene acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers mentioned in 1) above, for example polypropylene/ethylene-propylene-copolymers, LDPE/EVA, LDPE/EAA, LLDPE/EVA and LLDPE/EAA.

3a. Hydrocarbon resins (for example C$_5$-C$_9$) and hydrogenated modifications thereof (for example tackyfiers).

4. Polystyrene, poly-(p-methylstyrene), poly-(α-methylstyrene).

5. Copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylenediene terpolymer; and block copolymers of styrene, such as, for example, styrene/butadiene/styrene, styrene isoprene/styrene, styrene/ethylene/butylene/styrene or styrene/ ethylene/propylene/styrene.

6. Graft copolymers of styrene or u-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrine homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/dinylidene chloride, vinyl chloride/vinyl acetate or vinylidene chloride/vinyl acetate copolymers.

8. Polymers which are derived from α,β-unsaturated acids and derivatives thereof, such as polyacrylates and polymethacrylates, polyacrylamide and polyacrylonitrile.

9. Copolymers from the monomers mentioned under 8) with each other or with other unsaturated monomers, such as, for instance, acrylonitrile/butadien, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine; as well as their copolymers with olefins mentioned in (1) above.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with polystyrene or polyamides.

14. Polyuretanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylenediamine and adipic acid; polyamides prepared from hexamethylene diamine and isophthalic or/and terephthalic acid and optionally an elastomer as modifier, for example poly-2,4,4,-trimethylhexamethylene terephthalamide or poly-m-phenylene isophthalamide. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols. Polyamides or copolyamides modified with EPDM or ABS. Polyamides condensed during processing (RIM-polyamide systems).

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2,-(4-hydroxyphenyl) -propane]terephthalate and polyhydroxybenzoates as well as block-copolyether-esters derived from polyethers having hydroxyl end groups.

18. Polycarbonates and polyester-carbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Thermosetting acrylic resins, derived from substituted acrylic esters, such as epoxy-acrylates, urethane-acrylates or polyesteracrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatine and derivatives thereof which are chemically modified in a polymer-homologous manner, such as cellulose acetates, cellulose propionates and cellulose butyrates, or the cellulose ethers, such as methylcellulose; rosins and their derivatives.

27. Mixtures of polymers as mentioned above, for example PP/EPDM, Polyamide 6/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 6.6 and copolymers, PA/HDPE, PA/PP, PA/PPE.

28. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellithates) and also mixtures of synthetic esters with mineral oils in any weight ratios, which materials may be used as plasticizer for polymers or as textile spinning oils, as well as aqueous emulsions of such materials.

29. Aqueous emulsions of natural or synthetic rubber, e.g. natural latex or latices of carboxylated styrene/butadiene copolymers.

The novel polytriazine compounds are especially useful as light stabilizers for polypropylene fibres and tapes and for low-density polyethylene films.

The compounds of the invention can be mixed with the organic material in various proportions depending on the nature of the organic material, on the end use and on the presence of other additives.

In general, it is advantageous to employ from 0.01 to 5% by weight of the novel polytriazines, relative to the weight of the organic material, preferably from 0.05 to 1%. the compounds of the invention can be incorporated into the organic materials via various processes, such as dry blending in the form of powders, or wet mixing in the form of solutions or suspensions, or mixing in the form of a master-batch; in these operations, the organic material can be employed in the form of powder, granules, a solution, a suspension or in the form of a latex.

The polymers stabilized with the compounds of the invention can be used for the preparation of moulded articles, films, tapes, fibres, monofilaments, surface-coatings and the like.

If desired, other additives, such as e.g. antioxidants, UV absorbers, nickel stabilizers, pigments, fillers, plasticizers, antistatic agents, flameproofing agents, lubricants, anti-corrosion agents and metal deactivators, can be added to the mixtures of the compounds of the invention with the organic materials. Examples of additives which can be mixed with the novel polytriazines are in particular:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tertbutyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

1.6. Acylaminophenols, for example 4-hydroxyanilide of lauric acid, 4-hydroxyanilide of stearic acid, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of B-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.8. Esters. of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)-trimethylene-diamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives. 2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tertbutyl-4-hydroxybenzoate and hexadecyl 3,5-di-tert-butyl-4-hydroxybenzoate.

2.4. Acrylates, for example ethyl β-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoneoxime, nickel complexes of 1-phenyl-4-lauroyl-5-hydroxypyrazole, with or without additional ligands.

2.6. Sterically hindered amines, for example bis(2,2,6,6-tetramethylpiperidyl) sebacate, bis(1,2,2,6,6-pentamethylpiperidyl) sebacate, bis(1,2,2,6,6-pentamethylpiperidyl) n-butyl-3,5-di-tertbutyl-4-hydroxybenzylmalonate, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-striazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone).

2.7. Oxalic acid diamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl) pentaerythritol diphosphite, tristearyl sorbitol triphosphite, tetrakis(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, optical brighteners, flameproofing agents, antistatic agents and blowing agents.

The following examples illustrate the embodiments of this invention.

EXAMPLE 1:

(A) Preparation of 2,4-dichloro-6-[N,N'-bis-(2,2,6,6-tetramethyl-4-piperidyl)-formamidino]-1,3,5-triazine.

32.25 g (0.1 mol) of N,N'-bis-(2,2,6,6-tetramethyl-4-piperidyl)formamidine are slowly added to a solution, cooled to −20° C., of 18.45 g (0.1 mol) of cyanuric chloride in 300 ml of xylene, maintaining the temperature at −20° to −10° C.

After 2 hours at this temperature, 4 g (0.1 mol) of powdered sodium hydroxide are added, while not exceeding −10° C., and the mixture is then allowed to warm to 0° C. and held at this temperature for 3 hours and filtered, and the residue is taken up in 150 ml of dichloromethane and 100 ml of water.

The organic phase is separated off, washed twice more with water, dried over sodium sulfate and evaporated.

The residue is crystallized from methyl ethyl ketone.

The product obtained has a melting point of 179°–180° C.

Analysis for $C_{22}H_{37}Cl_2N_7$: Calculated: Cl=15.07% Found Cl=14.88%

(B) 47.05 g (0.1 mol) of 2,4-dichloro-6-[N,N'-bis-(2,2,6,6-tetramethyl-4-piperidyl)-formamidino]-1,3,5-triazine, 39.47 g (0.1 mol) of N,N'-bis-(2,2,6,6-tetramethyl-4-piperidyl)-1,6-hexanediamine, 8.8 g (0.22 mol) of powdered sodium hydroxide and 300 ml of xylene are heated under reflux for 16 hours, with removal of the water of reaction.

The mixture is cooled to room temperature, filtered and evaporated in vacuo (26.7 mbar).

This gives a solid resinous product which melts at 230°–240° C. and has a number average molecular weight of $\overline{M}n=3500$.

EXAMPLE 2:

32.25 g (0.1 mol) of N,N'-bis-(2,2,6,6-tetramethyl-4-piperidyl)-formamidine are slowly added to a solution, cooled to −20° C., of 18.45 g (0.1 mol) of cyanuric chloride in 300 ml of xylene, maintaining the temperature at −20° to −10° C.

After 2 hours at this temperature, 4 g (0.1 mol) of powdered sodium hydroxide are added, while not exceeding −10° C., and the mixture is allowed to warm to 0° C. and held for 3 hours at this temperature. 17.63 g (0.1 mol) of 4,7-dioxa-1,10-decanediamine and 8.8 g (0.22 mol) of powdered sodium hydroxide are then added and the mixture is heated under reflux for 16 hours, the water of reaction being separated off.

The mixture is cooled and filtered; the filtrate is evaporated in vacuo, giving a solid resinous product which melts at 180°–185° C. and has a number average molecular weight of $\overline{M}n=2020$.

EXAMPLE 3:

Analogously to the description in Example 2, a polytriazine is prepared from 18.45 g (0.1 mol) of cyanuric chloride, 32.25 g (0.1 mol) of N,N'-bis-(2,2,6,6-tetramethyl-4-piperidyl)formamidine and 12.92 g (0.1 mol) of N-(2-aminoethyl)-piperazine.

This gives a solid resinous product which melts at 225°–228° C. and has a number average molecular weight of $\overline{M}n=2420$.

EXAMPLE 4:

Analogously to the description in Example 2, a polytriazine is prepared from 18.45 g (0.1 mol) of cyanuric chloride, 32.25 g (0.1 mol) of N,N'-bis-(2,2,6,6-tetramethyl-4-piperidyl)formamidine and 11.62 g (0.1 mol) of 1,6-hexanediamine.

This gives a solid resinous product which melts at 161°–169° C. and has a number average molecular weight of $\overline{Mn}=2250$.

EXAMPLE 5:

Analogously to the description in Example 2, a polytriazine is prepared from 18.45 g (0.1 mol) of cyanuric chloride, 32.25 g (0.1 mol) of N,N'-bis-(2,2,6,6-tetramethyl-4-piperidyl)formamidine and 7.42 g (0.1 mol) of 1,3-propanediamine.

This gives a solid resinous product which melts at 182°–186° C. and has a number average molecular weight of $\overline{Mn}=1850$.

EXAMPLE 6:

32.25 g (0.1 mol) of N,N'-bis-(2,2,6,6-tetramethyl)-4-piperidyl)-formamidine are slowly added to a solution, cooled to −20° C., of 18.45 g (0.1 mol) of cyanuric chloride in 300 ml of xylene, while maintaining the temperature at −20° to −10° C.

After 2 hours at this temperature, 4 g (0.1 mol) of powdered sodium hydroxide are added, while not exceeding −10° C.

The mixture is then allowed to warm to 0° C. and held at this temperature for 3 hours. 19.73 g (0.05 mol) of N,N'-bis-(2,2,6,6-tetramethyl-4-piperidyl)-1,6-hexanediamine and 8.8 g (0.22 mol) of powdered sodium hydroxide are added and the mixture is heated at 70° C. for 2 hours; 6.97 g (0.06 mol) of 1,6-hexanediamine are then added and the mixture is heated under reflux for 16 hours, with removal of the water of reaction.

The mixture is cooled to ambient temperature and filtered. The filtrate is evaporated in vacuo (26.7 mbar), a solid resinous product being obtained which melts at 170°–180° C. and has a number average molecular weight of $\overline{Mn}=2700$.

EXAMPLE 7:

A mixture of 47.05 g (0.1 mol) of 2,4-dichloro-6-[N,N'-bis-(2,2,6,6-tetramethyl-4-piperidyl)-formamidino]-1,3,5-triazine, 31.57 g (0.08 mol) of N,N'-bis-(2,2,6,6-tetramethyl-4-piperidyl)1,6-hexanediamine, 3.5 g (0.03 mol) of 1,6-hexanediamine, 8.8 g (0.22 mol) of powdered sodium hydroxide and 300 ml of xylene is heated for 2 hours at 70° C. and for 16 hours under reflux, the water of reaction being separated off.

After cooling to ambient temperature, the reaction mixture is filtered and evaporated in vacuo (26.7 mbar).

This gives a solid resinous product which melts at 180°–190° C. and has a number average molecular weight of $\overline{Mn}=3400$.

EXAMPLE 8:

47.05 g (0.1 mol) of 2,4-dichloro-6-[N,N'-bis-(2,2,6,6-tetramethyl-4-piperidyl)-formamidino]-1,3,5-triazine, 9.25 g (0.1 mol) of epichlorohydrin, 78.93 g (0.2 mol) of N,N'-bis(2,2,6,6-tetramethyl-4-piperidyl)-1,6-hexanediamine and 100 ml of xylene are heated under reflux for 10 hours, 8.8 g (0.22 mol) of powdered sodium hydroxide being added slowly during the last 5 hours of reaction.

After the addition has ended, the reaction mixture is heated under reflux for a further 4 hours with azeotropic removal of water and then evaporated in vacuo (26.7 mbar).

The residue is then washed with water and dried.

This gives a solid resinous product which melts at 124°–129° C. and has a number average molecular weight of $\overline{Mn}=2500$.

EXAMPLE 9:

Analogously to the description in Example 8, a polytriazine is prepared from 47.05 g (0.1 mol) of 2,4-dichloro-6-[N,N'-bis(2,2,6,6-tetramethyl-4-piperidyl)-formamidino]-1,3,5-triazine, 18.5 g (0.2 mol) of epichlorohydrin and 118.41 g (0.3 mol) of N,N'-bis-(2,2,6,6-tetramethyl-4-piperidyl)-1,6-hexanediamine.

This gives a solid resinous product which melts at 108°–111° C. and has a number average molecular weight of $\overline{Mn}=3500$.

EXAMPLE 10:

22.14 g (0.12 mol) of cyanuric chloride are slowly added to a solution, cooled to −10° C., of 25.24 g (0.12 mol) of methylenebis(cyclohexylamine) in 200 ml of xylene, maintaining the temperature at −10° C. to 0° C.

After the addition has ended, the mixture is allowed to warm to ambient temperature in the course of 1 hour.

It is then cooled again to 0° C., and 10.4 g (0.26 mol) of powdered sodium hydroxide are added.

The mixture is then heated for 3 hours at 40°–50° C. 40.64 g (0.126 mol) of N,N'-bis-(2,2,6,6-tetramethyl-4-piperidyl)formamidine are then added and the mixture is heated under reflux for 3 hours; 7 g (0.175 mol) of powdered sodium hydroxide are added and, finally, the mixture is heated under reflux for 16 hours, the water of reaction being separated off.

The mixture is then cooled and filtered; the filtrate is evaporated in vacuo, a solid resinous product being obtained which melts at 192°–200° C. and has a number average molecular weight of $\overline{Mn}=1600$.

EXAMPLE 11:

Analogously to the description in Example 2, a polytriazine is prepared from 18.45 g (0.1 mol) of cyanuric chloride, 35.06 g (0.1 mol) of N,N'-bis-(1,2,2,6,6-pentamethyl-4-piperidyl)formamidine and 11.62 g (0.1 mol) of 1,6-hexanediamine.

This gives a solid resinous product which melts at 185°–193° C. and has a number average molecular weight of $\overline{Mn}=3200$.

EXAMPLE 12:

Analogously to the description in Example 2, a polytriazine is prepared from 18.45 g (0.1 mol) of cyanuric chloride, 33.65 g (0.1 mol) of N,N'-bis-(2,2,6,6-tetramethyl-4-piperidyl)acetamidine and 11.62 g (0.1 mol) of 1,6-hexanediamine.

This gives a solid resinous product which melts at 158°–165° C. and has a number average molecular weight of $\overline{Mn}=2400$.

EXAMPLE 13:

47.05 g (0.1 mol) of 2,4-dichloro-6-[N,N'-bis-(2,2,6,6-tetramethyl-4-piperidyl)-formamidino]-1,3,5-triazine, (prepared as described in Example 1A), 23.24 g (0.2 mol) of 1,6-hexanediamine, 12 g (0.3 mol) of ground sodium hydroxide and 200 ml of xylene are heated under reflux for 16 hours, the water of reaction being separated off. The mixture is cooled and 17.42 g (0.1 mol) of methyl adipate are added. The mixture is then heated under reflux for 8 hours, the methanol of reaction being separated off. The mixture is cooled again and filtered; the filtrate is evaporated in vacuo (2.4 mbar).

This gives a solid resinous product which melts at 110°–115° C. and has a number average molecular weight of $\overline{M}n = 3000$.

EXAMPLE 14:

2.5 g of each of the compounds indicated in Table 1, 0.5 g of tris-(2,4-di-t-butylphenyl)phosphite; 0.5 g of calcium monoethyl 3,5-di-t-butyl-4-hydroxybenzyl-phosphonate, 1 g of calcium stearate and 2.5 g of titanium dioxide are mixed in a powder mixer with 1000 g of polypropylene powder (melt index = 12 g/10 min; measured at 230° C and 2.16kp).

The mixtures are extruded at 200°–220° C. to give polymer granules which are then converted into fibres, using a semi-technical scale apparatus (Leonard-Sumirago (VA) Italy), under the following working conditions:
extruder temperature: 200°–230° C.
head temperature: 255°–260° C.
stretch ratio: 1:3.5
titre: 11 dtex per filament The fibres thus prepared are exposed, mounted on a white card, in a 65 WR model Weather-O-Meter (ASTM G 26-77) at a black panel temperature of 63° C.

The residual tenacity is measured on samples, taken after various times of exposure to light, by means of a constant-speed tensometer; the exposure time in hours needed to halve the initial tenacity ($T_{50}$) is then calculated.

For comparison, fibres prepared under the same conditions as indicated above, but without the addition of the compounds of the invention, are exposed.

The results obtained are shown in Table 1:

TABLE 1

| Stabilizer | $T_{50}$ (hours) |
|---|---|
| Without stabilizer | 165 |
| Compound of Example 5 | 1650 |
| Compound of Example 6 | 1740 |
| Compound of Example 7 | 1800 |
| Compound of Example 8 | 2150 |
| Compound of Example 9 | 2070 |

EXAMPLE 15:

1.0 g of each of the compounds indicated in Table 2, 0.3 g of octadecyl 3-(3,5-di-t-butyl-4-hydroxyphenyl)-propionate and 0.1 g of calcium stearate are intimately mixed with 1000 g of low density polyethylene powder (melt index=0.6 g/10 min; measured at 190° C. and 2.16kp).

The mixture obtained is then extruded at a temperature of 190° C. and converted into granules, from which thin sheets of 0.2 mm thickness are obtained by melting under pressure at 200° C., and these are exposed on a white card in a 65 WR Weather-0-Meter (ASTM G 26-77) at a black panel temperature of 63° C. The time in hours ($T_{0.1}$) needed for the carbonyl group content to increase to 0.1%, measured at 5.85 micrometers, is determined on the exposed samples.

For comparison, a thin sheet of polymer is prepared and exposed to light under the same conditions as indicated above, but without the addition of stabilizers prepared according to the invention.

The results obtained are shown in Table 2:

TABLE 2

| Stabilizer | $T_{0.1}$ (hours) |
|---|---|
| Without stabilizer | 270 |
| Compound of Example 1 | 3830 |
| Compound of Example 5 | 3350 |
| Compound of Example 6 | 3770 |
| Compound of Example 7 | 3950 |
| Compound of Example 8 | 3330 |

In the above examples the number average molecular weight is determined according to the following description:

The determination is carried out in a vapor pressure osmometer (®KNAUER). The osmometer consists of a thermostatic chamber saturated with the analytical solvent in which two thermistors are situated; one for reference and one for measurement.

Before the beginning of the measurement a drop of pure solvent is put on each thermistor and the bridge is adjusted to zero after 5 minutes.

Then a solution containing a substance of known molecular weight ($M_{Ref}$) is measured. For this purpose the solvent on the measurement thermistor is replaced by a drop of a known concentration solution and the change of resistance to rebalance the bridge after 5 minutes is determined. This procedure is carried out for four solutions of different concentrations (0.01 molal, 0.02 molal, 0.03 molal and 0.04 molal*). Extrapolation to infinite dilution gives $K_{Ref}=\text{const}/M_{Ref}$.

*) The molality corresponds to n moles per 1000 g solvent.

The measurements are repeated with the solutions containing a substance of unknown molecular weight (Mn). Extrapolation to infinite dilution gives $K_{Meas}=\text{const}/Mn$.

Then the number average molecular weight is calculated according to the following equation:

$$Mn = \frac{K_{Ref} M_{Ref}}{K_{Meas}}$$

We claim:

1. A polytriazine compound having a number average molecular weight from 1000 to 20 000 and containing recurring piperidylamidinotriazine structural units of the formula (IA)

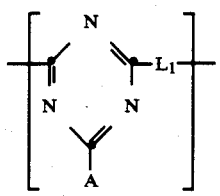 (IA)

or a combination of said structural units of the formula (IA) with recurring structural units of the formula (IB)

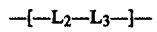 (IB)

with molar proportions of (IA) and (IB) from 30% to 100% for (IA) and 0 to 70% for (IB),
A is a group of the formula (II)

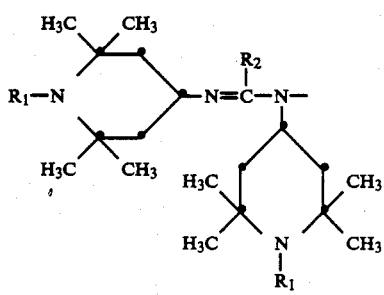 (II)

where $R_1$ is hydrogen, O, CN, NO, cyanomethyl, $C_1$–$C_{12}$-alkyl, $C_3$–$C_{12}$-alkenyl or $C_3$–$C_{12}$-alkynyl with the proviso that the carbon atom attached to the nitrogen atom is a primary carbon atom, $C_7$–$C_{12}$-aralkyl, $C_1$–$C_{12}$-acyl, 2,3-epoxypropyl, 2,3-dihydroxypropyl or $C_5$–$C_{18}$-aryl, 2,3-epoxypropyl, 2,3-dihydroxypropyl or OH-monosubstituted $C_2C_6$-alkyl and $R_2$ is hydrogen, $C_1$–$C_{18}$-alkyl, $C_5$–$C_{18}$-cycloalkyl, $C_6$–$C_{18}$aryl or $C_7$–$C_{18}$-aralkyl, $L_1$ and $L_3$ which are identical or different are groups of the formula (III)

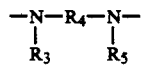 (III)

in which $R_3$ and $R_5$ which are identical or different are hydrogen, $C_1$–$C_{12}$-alkyl, $C_5$–$C_{12}$-cycloalkyl or a group of the formula (IV)

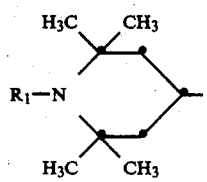 (IV)

with $R_1$ being as defined above, and $R_4$ is $C_2$–$C_{12}$-alkylene, $C_6$–$C_{15}$-cycloalkylene, $C_6$–$C_{12}$-arylene, $C_7$–$C_{12}$-aralkylene or $C_4$–$C_{12}$-alkylene which is interrupted in the chain by one or two oxygen atoms or by one or two groups

$R_6$ being as defined for $R_3$ and $R_5$, or $L_1$ and/or $L_3$ are heterocyclic groups of the formula (V), (Va) or (Vb)

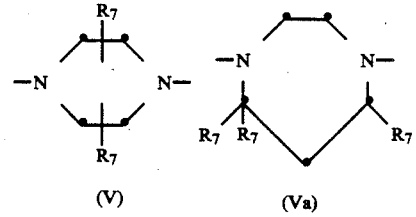

(V)    (Va)

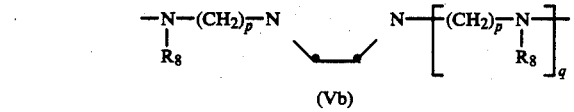

(Vb)

in which $R_7$ is hydrogen or methyl, $R_8$ is as defined for $R_3$ and $R_5$, p is an integer from 2 to 6 and q is 0 or 1, and, if the polytriazine compound essentially consists of recurring structural units of the formula (IA), $L_1$ is additionally group of the formula (VI)

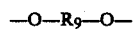 (VI)

in which $R_9$ is $C_2$–$C_{12}$-alkylene, $C_4$–$C_{12}$-alkylene, which is interrupted in the chain by one or two oxygen atoms, $C_6$–$C_{15}$-cycloalkylene, $C_6$–$C_{12}$-arylene, $C_7$–$C_{12}$-aralkylene or a group of the formula (VII)

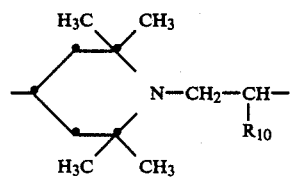 (VII)

with $R_{10}$ being hydrogen, $C_1C_4$alkyl or phenyl, $L_2$ is $C_2$–$C_{12}$-alkylene, $C_4$–$C_{12}$-alkylene which is interrupted in the chain by one or two oxygen atoms, $C_3$–$C_6$-hydroxyalkylene, $C_7$–$C_{12}$-aralkylene, $C_2$–$C_{18}$-diacyl, $C_4$–$C_{18}$-dicarbamoyl, $C_1$–$C_{10}$-alkylene-CO-or a group of the formula (VIII) or (IX)

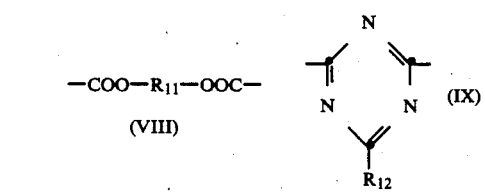

(VIII)    (IX)

in which $R_{11}$ is as defined for $R_9$ and $R_{12}$ is morpholino, pyrrolidino, piperidino, 1-hexahydroazepinyl or a group $R_{13}Z$- where $R_{13}$ is hydrogen, $C_1$–$C_{12}$-alkenyl, $C_5$–$C_{12}$-cycloalkyl, $C_3$–$C_{12}$alkenyl or a group of the formula (IV) and —Z— is —O—, —S— or a group

where $R_{14}$ is as defined for $R_{13}$, with the proviso that, if the polytriazine compound contains a combination of structural units of the formula (IA) with those structural units of the formula (IB), at least one group of the formula (IV) is present in $L_1$ or $L_2$ or $L_3$.

group $R_{13}Z-$ where $R_{13}$ is hydrogen, $C_1-C_8$-alkyl, $C_6-C_9$-cycloalkyl, $C_3-C_6$-alkenyl or a group of the formula (IV) with $R_1$ being as defined above and Z is —O— or a group

where $R_{14}$ is as defined for $R_{13}$.

2. The compound according to claim 1, in which $R_1$ is hydrogen, methyl, allyl, benzyl or acetyl, $R_2$ is hydrogen, $C_1-C_{12}$-alkyl, $C_6-C_9$-cycloalkyl or $C_6-C_9$-aryl, $L_1$ and $L_3$ which are identical or different are groups of the formula (III) in which $R_3$ and $R_5$ which are identical or different are hydrogen, $C_1-C_8$-alkyl, $C_6-C_9$-cycloalkyl or a group of the formula (IV) with $R_1$ being as defined above and $R_4$ is $C_2-C_{12}$-alkylene, $C_4-C_{12}$-alkylene interrupted in the chain by one or two oxygen atoms or is $C_6-C_{15}$-cycloalkylene, or $L_1$ and/or $L_3$ are

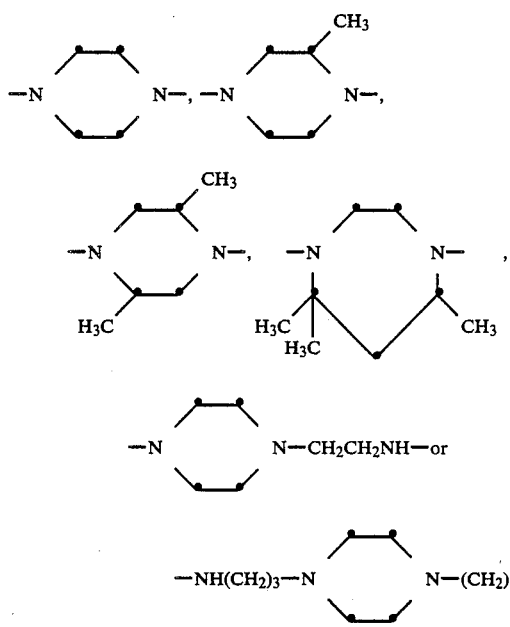

and, if the polytriazine compound essentially consists of recurring structural units of the formula (IA), L: is additionally a group of the formula (VI) in which $R_9$ is $C_2-C_{10}$-alkylene, $C_4-C_6$-alkylene interrupted in the chain by one or two oxygen atoms, $C_6-C_{15}$-cycloalkylene or a group of the formula (VII) with $R_{10}$ being hydrogen or methyl, $L_2$ is $C_2-C_{10}$-alkylene, 2-hydroxypropane-1,3-diyl, xylylene, $C_2-C_{12}$-diacyl, a group $-(CH_2)_s-CO-$ where s is an integer from 2 to 5, a group of the formula (VIII) with $R_{11}$ being $C_4-C_{10}$-alkylene or $C_6-C_{15}$-cycloalkylene, or a group of the formula (IX) in which $R_{12}$ is morpholino, piperidino, 1-hexahydroazepinyl or a 3. The compound according to claim 1, wherein $R_1$ and $R_2$ independently of one another are hydrogen or methyl, $L_1$ and $L_3$ which are identical or different are groups of the formula (III) in which $R_3$ and $R_5$ which are identical or different are hydrogen, $C_1-C_4$-alkyl, cyclohexyl, 2,2,6,6-tetramethyl-4-piperidyl or 1,2,2,6,6-pentamethyl-4-piperidyl and $R_4$ is $C_2-C_6$-alkylene or $C_6-C_{10}$-alkylene interrupted in the chain by 2 oxygen atoms, or $L_1$ and/or $L_3$ are

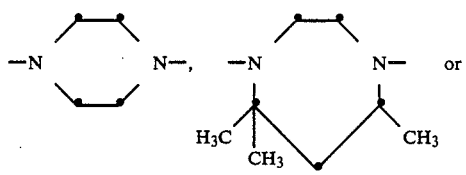

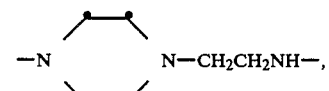

$L_2$ is $C_2-C_6$-alkylene, 2-hydroxypropane-1,3-diyl, xylylene, $C_2C_6$-diacyl or $-CH_2CO-$.

4. The compound according to claim 1, containing recurring structural units of the formula (IA) wherein $R_1$ and $R_2$ are hydrogen and $L_1$ is a group

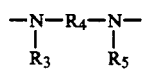

in which $R_3$ and $R_5$ are independently hydrogen or 2,2,6,6-tetramethyl-4-piperidyl and $R_4$ is $-(CH_2)_{2-6}-$ or $-(CH_2)_3O(CH_2)_3-$, or $L_1$ is

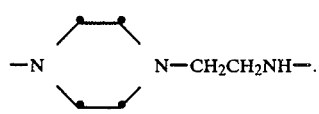

5. The compound according to claim 1, containing recurring structural units of the formula (IA), wherein $R_1$ and $R_2$ are hydrogen and $L_1$ is a group

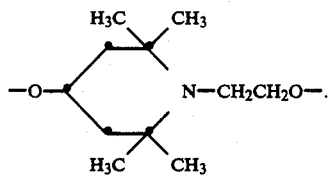

6. The compound according to claim 1, wherein $R_1$ and $R_2$ are hydrogen, $L_1$ and $L_3$ are independently

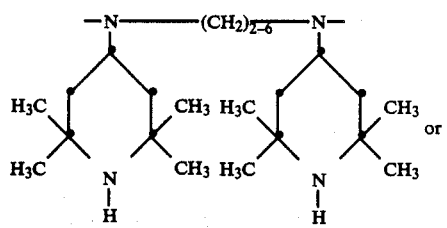

7. The compound according to claim 1, wherein $R_1$ and $R_2$ are independently hydrogen or methyl, $L_1$ and $L_3$ are independently groups of the formula (III) in which $R_3$ and $R_5$ are independently hydrogen, cyclohexyl or 2,2,6,6-tetramethyl-4-piperidyl and $R_4$ is $C_2$–$C_6$alkylene or $C_4C_{12}$-alkylene which is interrupted in the chain by one or two oxygen atoms, or are a group of the formula (Vb) with q=0, p being an integer from 2 to 6 and $R_8$ being hydrogen, and $L_2$ is 2-hydroxypropylene or $C_2$–$C_{18}$-alkanedioyl.

8. The compound according to claim 1, containing recurring piperidylamidinotriazine structural units of the formula

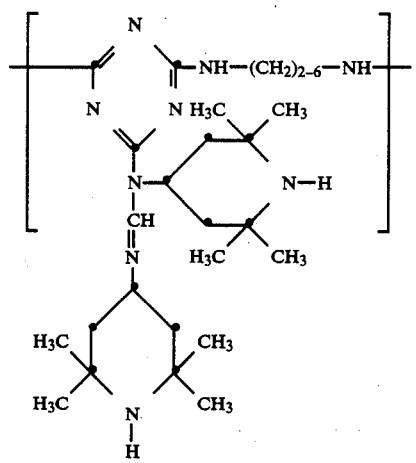

or

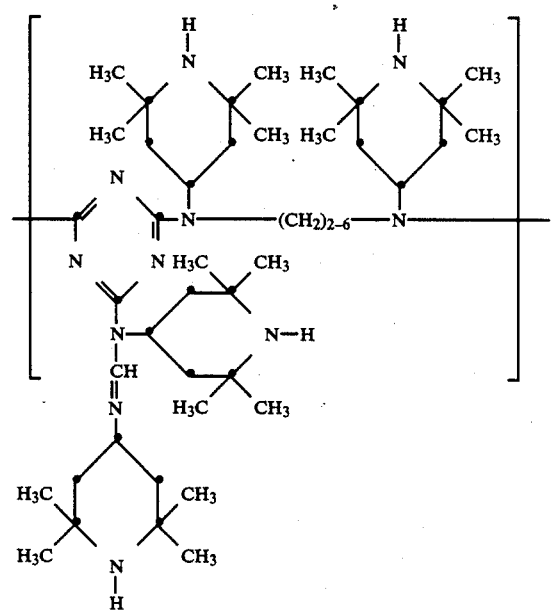

or containing a combination of recurring structural units of the formula

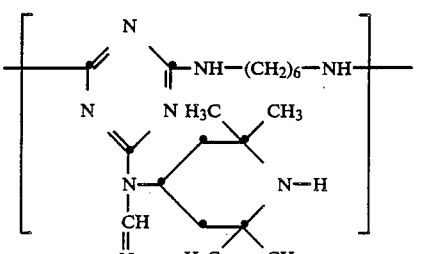
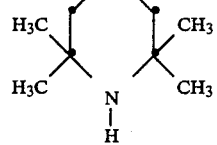
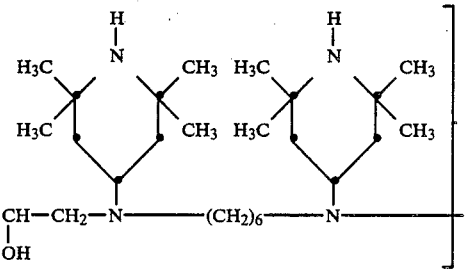
9. The compound according to claim 1, having a number average molecular weight from 1500 to 10 000.
10. The compound according to claim 1, having a number average molecular weight from 2000 to 5000.
* * * * *
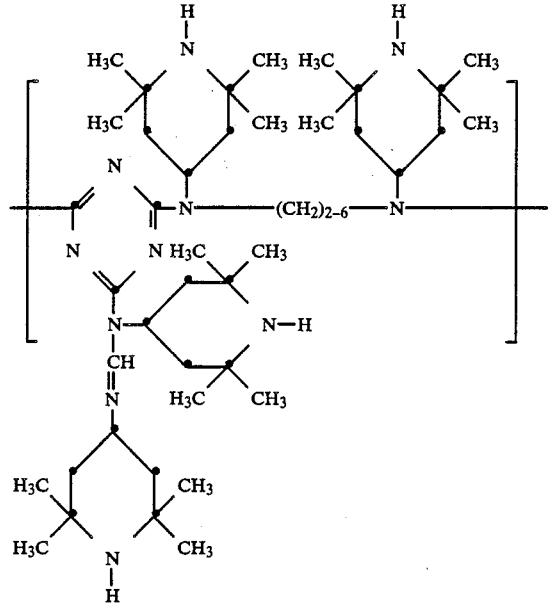
with recurring structural units of the formula